(12) United States Patent
Kiyama et al.

(10) Patent No.: US 11,821,050 B2
(45) Date of Patent: Nov. 21, 2023

(54) FABRICATION METHOD OF TUBULAR MEMBER

(71) Applicant: HONDA MOTOR CO., LTD., Tokyo (JP)

(72) Inventors: Takeshi Kiyama, Wako (JP); Yuji Miki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 17/199,479

(22) Filed: Mar. 12, 2021

(65) Prior Publication Data
US 2021/0292865 A1 Sep. 23, 2021

(30) Foreign Application Priority Data
Mar. 19, 2020 (JP) .................. 2020-048826

(51) Int. Cl.
*C21D 9/08* (2006.01)
*B23P 15/00* (2006.01)
*B23P 11/00* (2006.01)
*C21D 9/14* (2006.01)

(52) U.S. Cl.
CPC ............... *C21D 9/08* (2013.01); *B23P 11/00* (2013.01); *B23P 15/00* (2013.01); *C21D 9/14* (2013.01); *Y10T 29/4932* (2015.01); *Y10T 29/5185* (2015.01)

(58) Field of Classification Search
CPC ............. Y10T 29/4932; Y10T 29/5185; Y10T 29/5199; C21D 9/14
See application file for complete search history.

(56) References Cited

U.S. PATENT DOCUMENTS

| 3,619,547 A | * | 11/1971 | Cavagnero | B23K 11/04 219/67 |
| 8,950,230 B2 | * | 2/2015 | Smith | B21C 37/155 72/367.1 |
| 10,526,680 B2 | * | 1/2020 | Panier | C21D 1/38 |

(Continued)

FOREIGN PATENT DOCUMENTS

| JP | 48-103452 | 12/1973 |
| JP | 10-080726 | 3/1998 |

(Continued)

OTHER PUBLICATIONS

English Machine Translation of JP3555353B2, Kobari et al., Aug. 2004 (Year: 2004).*

(Continued)

*Primary Examiner* — Sarang Afzali
(74) *Attorney, Agent, or Firm* — AMIN, TUROCY & WATSON, LLP

(57) ABSTRACT

A part of a plate member is machined to remove material therefrom so as to obtain an intermediate product having a thickness difference. Then, the intermediate product is bent and both edges thereof are joined to obtain a cylindrical body. Further, a first heat treatment of heating the cylindrical body is performed. Then, through holes penetrating from the outside to the inside of the peripheral wall of the cylindrical body are formed. Pipe parts are joined to the tubular body thus obtained to form a tubular member. This tubular member is subjected to a second heat treatment.

11 Claims, 11 Drawing Sheets

(56) References Cited

U.S. PATENT DOCUMENTS

2009/0283941 A1* 11/2009 Rosenzweig ............ C21D 1/78
266/44
2013/0309523 A1   11/2013 Sugai et al.

FOREIGN PATENT DOCUMENTS

| JP | 2000-301240 | 10/2000 |
| JP | 2001-150026 | 6/2001 |
| JP | 3555353 B2 * | 8/2004 |
| JP | 2006-272457 | 10/2006 |
| JP | 2012-213792 | 11/2012 |

OTHER PUBLICATIONS

Japanese Office Action for Japanese Patent Application No. 2020-048826 dated Sep. 26, 2023.

* cited by examiner

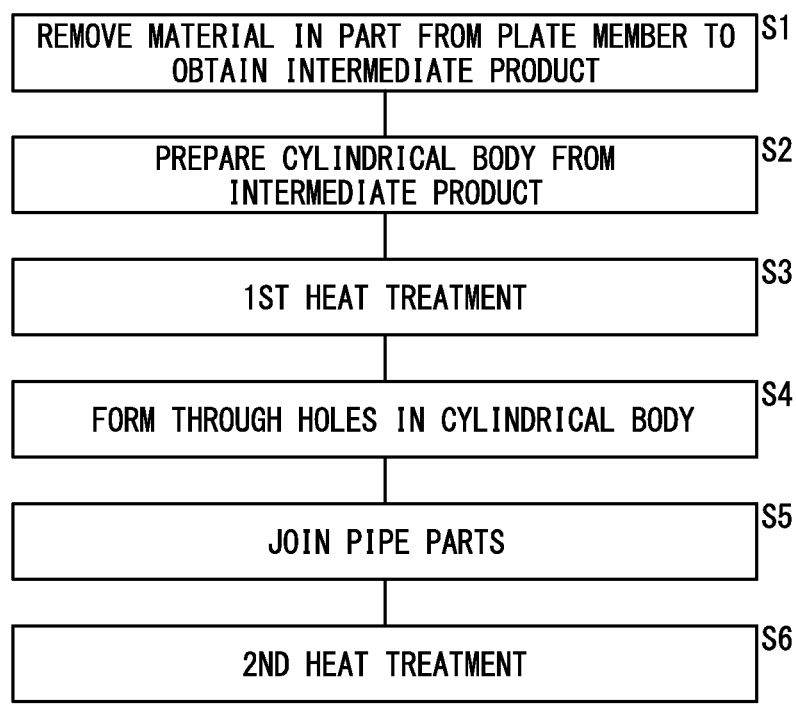

(BEFORE TEMPERATURE RISE)

(DURING TEMPERATURE RISE)

(AFTER TEMPERATURE RISE)

FIG. 7

| No. | CORRECTION JIG | | CYLINDRICAL BODY | |
|---|---|---|---|---|
| | MATERIAL | THERMAL EXPANSION COEFFICIENT ($10^{-6}$ °C) | MATERIAL | THERMAL EXPANSION COEFFICIENT ($10^{-6}$ °C) |
| 1 | STAINLESS STEEL | 17.3 | Ni-BASED ALLOY | 12 |
| 2 | NICKEL STEEL | 18 | CARBON STEEL | 12.2 |
| 3 | MANGANESE STEEL | 18.4 | COBALT HEAT-RESISTANT STEEL | 12.3 |

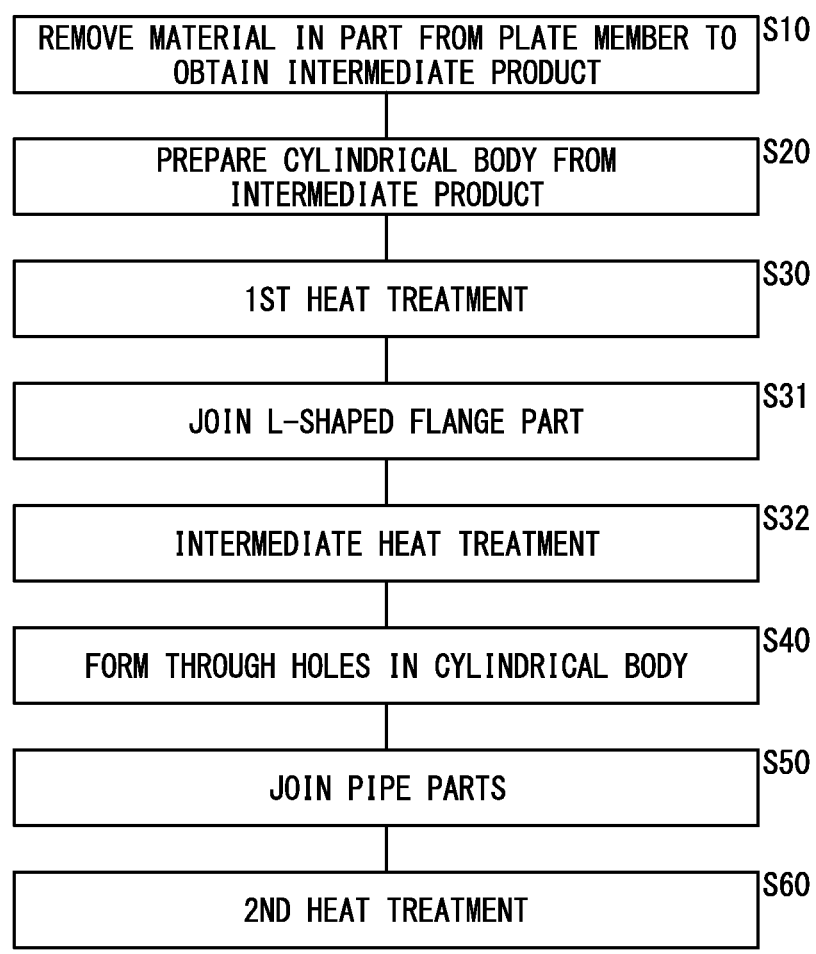

FABRICATION METHOD OF TUBULAR MEMBER

CROSS-REFERENCE TO RELATED APPLICATION

This application is based upon and claims the benefit of priority from Japanese Patent Application No. 2020-048826 filed on Mar. 19, 2020, the contents of which are incorporated herein by reference.

BACKGROUND OF THE INVENTION

Field of the Invention

The present invention relates to a method for fabricating a tubular member having different wall thicknesses and provided with pipe parts.

Description of the Related Art

A pressure vessel is built in a gas turbine engine. This type of pressure vessel is generally configured to include a tubular member having a tubular body formed with through holes, and pipe parts provided in the tubular body at positions where the through holes are formed. In this tubular member, a pressure fluid is supplied and discharged to the hollow inside the tubular body through the pipe parts that are connected to other components.

If the pipe part is misaligned with respect to the other components, it becomes difficult to connect the pipe part with the other components. Therefore, it is desired to form the through holes at the accurate positions. In order to achieve this, it is conceivable that the roundness, diameter, and other details of the tubular body are approximated to the design values as much as possible. As techniques for this purpose, use of correction jigs as disclosed in Japanese Laid-Open Patent Publication No. 10-080726, Japanese Laid-Open Patent Publication No. 2000-301240, and Japanese Laid-Open Patent Publication No. 2001-150026, has been known.

That is, a correction jig is set inside a workpiece, then the workpiece and the correction jig are heated. Since the linear expansion coefficient of the correction jig is specified to be larger than that of the workpiece, the workpiece is pressed by the correction jig from the inner wall side. This pressing is aimed at trying to bring the roundness and the diameter of the workpiece within the predetermined ranges.

In addition, in order to reduce the weight of the turbine gas engine, part of the outer wall of the tubular member may be removed. In this case, the tubular member has a thin-walled portion from which an amount of material has been removed and a thick-walled portion having a thickness relatively greater than that of the thin-walled portion because no material has been removed, thus a different in wall thickness is formed. Here, the material is removed by so-called chemical milling, which removes material by immersing the tubular member in a chemical solution. Since, in chemical milling, no heat is applied to the tubular member or no machining is performed, there is an advantage that it is possible to avoid generation of distortion in the tubular member and generation of residual stress.

SUMMARY OF THE INVENTION

Since the chemical milling needs a pool for storing the chemical solution and equipment for processing the used chemical solution, there is a problem that capital investment escalates. In addition, it takes a long time to remove a predetermined amount of material. For these reasons, it is not easy to reduce the cost of completing the tubular member.

For this reason, it is considered that a plate member is subjected to machining such as grinding so as to remove material, then the plate member is bent and joined at its edges. However, this method involves an apparent drawback that it is not easy to improve the roundness of the tubular member.

It is therefore a primary object of the present invention to provide a fabrication method of a tubular member that can make the roundness and the diameter of the tubular member as close as possible to specified values even when a thin-walled portion is formed by machining.

One aspect of the invention resides in a fabrication method of a tubular member comprising: a tubular body having a peripheral wall including a thick-walled portion and a thin-walled portion, and a through hole penetrating from an outside to an inside of the peripheral wall; and a pipe part attached to the through hole, the fabrication method comprising: a material removing step of removing material by machining a part of a plate member to obtain an intermediate product including a thin-walled portion where the material is removed and a thick-walled portion with no material removed, the thick-walled portion being thicker than the thin-walled portion; an edge joining step of bending the intermediate product and joining both edges thereof to obtain a cylindrical body; a first heat treatment step of performing a first heat treatment on the cylindrical body; a through hole forming step of forming a through hole from the outside to the inside of the peripheral wall of the cylindrical body; a pipe part joining step of joining the pipe part to a portion where the through hole is formed, to obtain a tubular member; and a second heat treatment step of performing a second heat treatment on the tubular member.

According to the present invention, a cylindrical body having a thin-walled portion is subjected to a first heat treatment to improve the roundness of the cylindrical body, and then a through hole is formed in the cylindrical body, and a pipe part is joined to form a tubular member. Further, the tubular member is subjected to a second heat treatment. By the first heat treatment, the through hole can be formed at an accurate position. Additionally, even if distortion occurs while the through hole is formed or the pipe part is joined, the tubular member is reformed by the second heat treatment.

Therefore, even when the thin-walled portion of the cylindrical body is formed by machining, the deviations of the roundness and the diameter from the specified values can be kept within their tolerance ranges (the roundness and the diameter can be approximated to the specified values as close as possible).

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a schematic flow illustrating a fabrication method of a tubular member according to a first embodiment of the present invention;

FIG. 7 is a chart illustrating appropriate combinations of the material of the correction jig and the material of the cylindrical body;

FIG. 11 is a schematic flow illustrating a fabrication method of a tubular member (flange-attached tubular member) according to a second embodiment of the present invention.

DESCRIPTION OF THE PREFERRED EMBODIMENTS

Now, preferred embodiments of fabrication methods of a tubular member according to the present invention will be described in detail with reference to the accompanying drawings.

Figure 1:
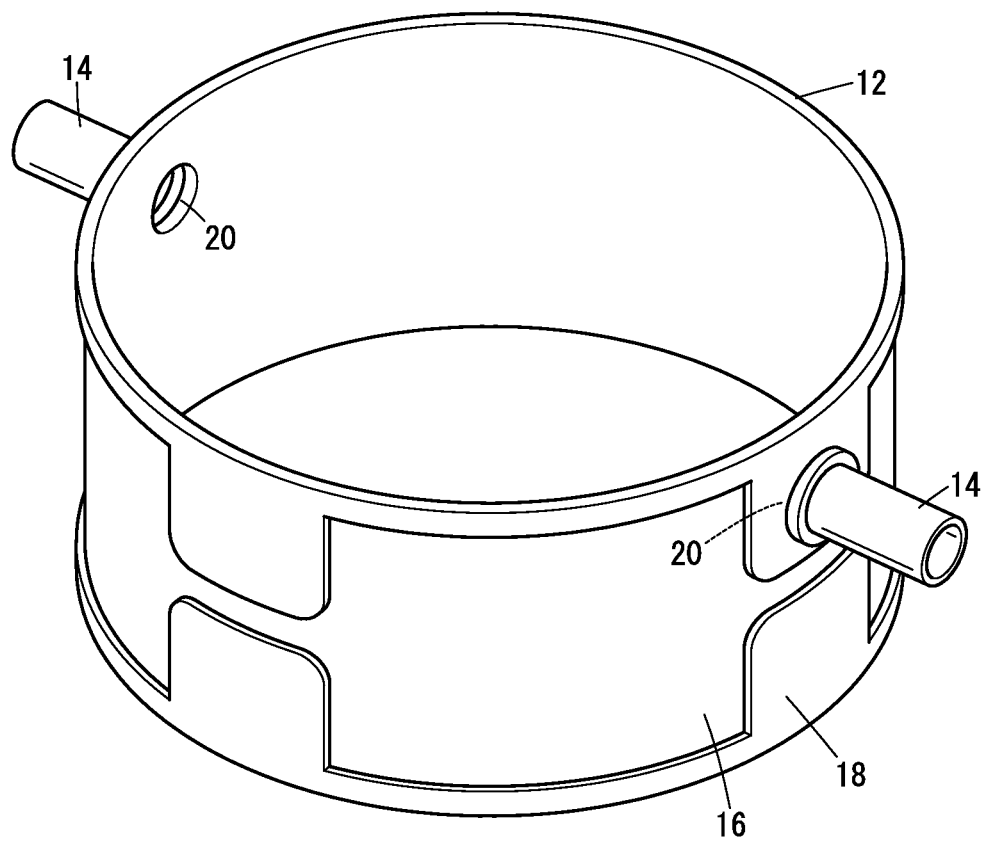
FIG. 1 is an overall schematic perspective view showing a tubular member as a finished product.

To begin with, a tubular member 10 as a finished product will be described with reference to FIG. 1. The tubular member 10 has a tubular body 12 and pipe parts 14. The tubular body 12 has a thin-walled portion 16 formed by removing material from the outer surface of the peripheral wall and a thick-walled portion 18 remaining as is without removal of material and hence thicker relative to the thin-walled portion 16. A step is formed on the outer surface of the peripheral wall of the tubular member 10 based on the difference in wall thickness between the thin-walled portion 16 and the thick-walled portion 18. Formation of the thin-walled portion 16 reduces the weight of the tubular member 10. Removal of material is performed by machining as described later. The tubular body 12 and the pipe parts 14 are made of a nickel-based alloy, and a typical example is Inconel 718 (trade name).

A plurality of through holes 20 are formed in the thick-walled portion 18. Each of the through holes 20 extends parallel to the diameter of the tubular member 10, from the outside to the inside of the peripheral wall of the thick-walled portion 18. Each through hole 20 is formed at a position where the pipe part 14 can be easily connected to a predetermined component when the pressure vessel including the tubular member 10 is assembled in a gas turbine engine.

The pipe part 14 is arranged at a position where the through hole 20 is formed, with its large-diametric flange formed at the proximal portion joined to the thick-walled portion 18 of the peripheral wall, for example. The joining is performed, for example, by welding. As expected, the hollow inside the pipe part 14 is made to communicate the inside hollow of the tubular body 12 via the through hole 20.

Next, the fabrication method for obtaining the above-described tubular member 10 will be explained. As shown in FIG. 2, the fabrication method according to the first embodiment includes a material removing step S1, an edge joining step S2, a first heat treatment step S3, a through hole forming step S4, a pipe part joining step S5, and a second heat treatment step S6.

Figure 3A:
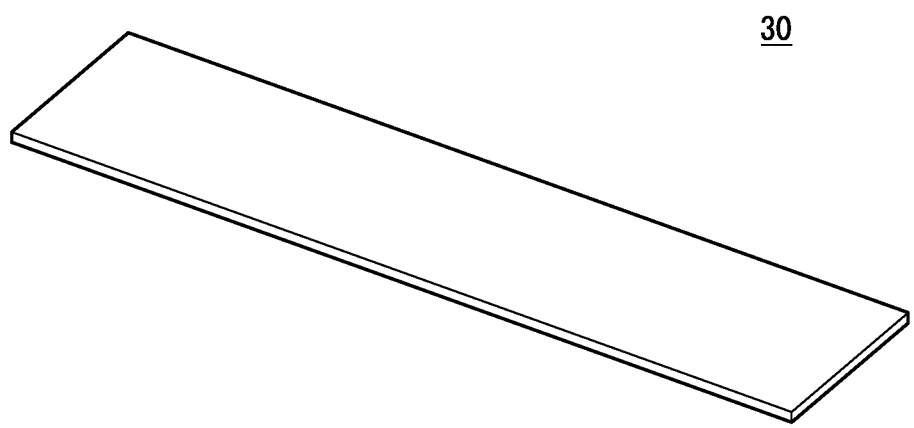
FIG. 3A is an overall schematic perspective view showing a plate member for producing a tubular member.
Figure 3B:
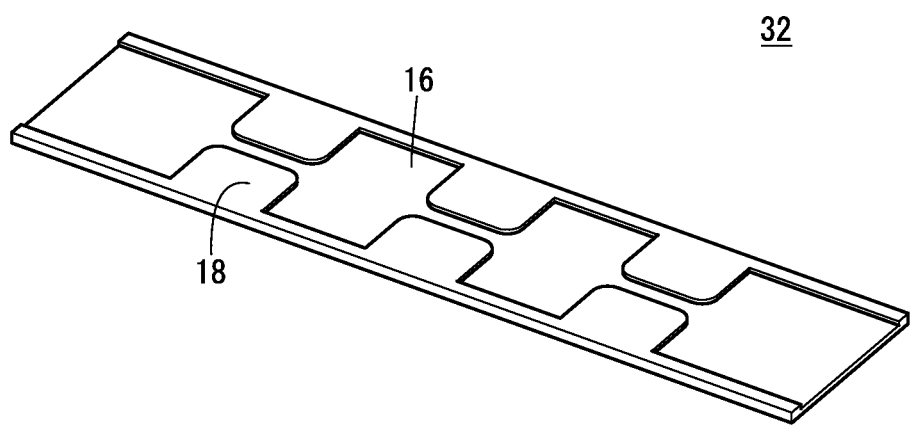
FIG. 3B is an overall schematic perspective view showing an intermediate workpiece obtained by removing material from the plate member.

First, at the material removing step S1, a plate member 30 shown in FIG. 3A is subjected to machining such as grinding to remove the material from its one side. As a result, as shown in FIG. 3B, the thin-walled portion 16 is formed on one side of the plate member 30 where the material has been removed. On the other hand, the portion with no material removed remains as the thick-walled portion 18 having a relatively large thickness as compared with the thin-walled portion 16. Thus, when the material removing step S1 is completed, an intermediate product 32 with a wall thickness difference, in other words, with a step, is obtained.

In this way, in the present embodiment, the thin-walled portion 16 is formed without using chemical milling. Therefore, there is no need for a pool for performing chemical milling and equipment for processing used chemicals. Thus, capital investment can be cut down proportionally. Further, use of a machining process is advantageous in that the thin-walled portion 16 can be formed in a shorter time than when chemical milling is performed.

Figure 4:
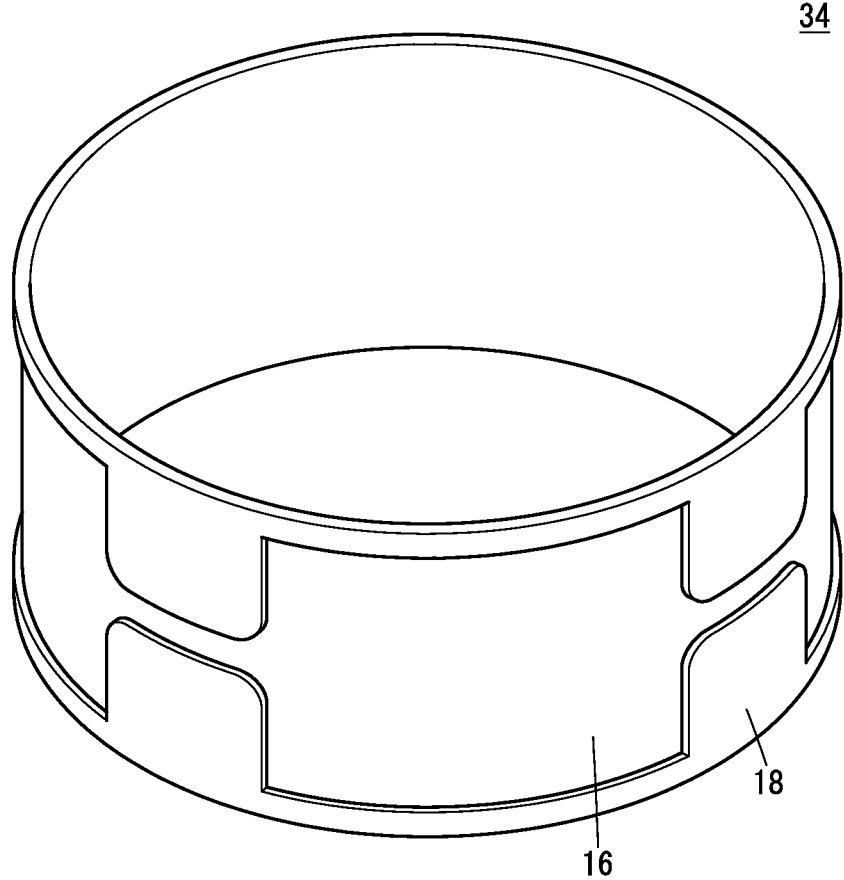
FIG. 4 is an overall schematic perspective view showing a cylindrical body obtained from the intermediate workpiece of FIG. 3B.

Next, the edge joining step S2 is performed. Specifically, the intermediate product 32 formed with the wall thickness difference is bent so that its edges come close to each other. For this purpose, for example, roll forming may be used. Further, surfaces of both edges are brought into contact with each other to form an abutment surface, along which welding is performed to join the edges. Alternatively, friction stir welding may be performed. As a result, a cylindrical body 34 shown in FIG. 4 is prepared. At this stage, even if the cylindrical body 34 is elliptical or wavy having a rather low roundness as viewed from top (see FIG. 6A), it is no cause for concern.

Figure 5:
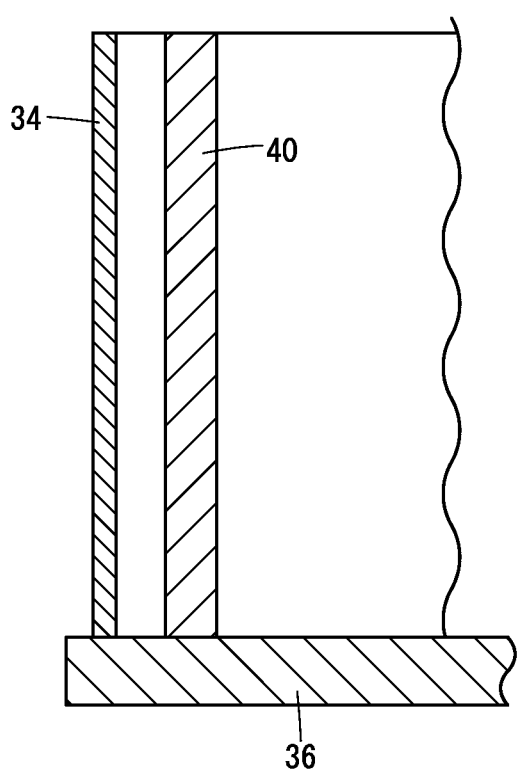
FIG. 5 is a vertical section partly showing the positional relationship between the cylindrical body and a correction jig before temperature rise.
Figure 6A:
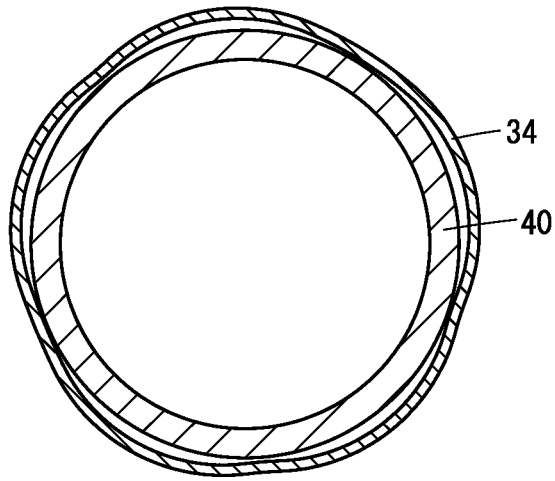
FIGS. 6A, 6B, and 6C are schematic plan views showing change in the shapes of, and the relationship between, the cylindrical body and the correction jig, from before temperature rise up to after temperature fall.

In the present embodiment, the cylindrical body 34 obtained as described above is subjected to a first heat treatment (first heat treatment step S3). At this step, a holding jig 36 and a correction jig 40, which are partially shown in FIG. 5, are used. Herein, the correction jig 40 is a cylindrical body having a predetermined wall thickness as shown in FIG. 6A, and made of a material having a linear expansion coefficient greater than that of the cylindrical body 34. The difference in the thermal expansion coefficient (linear expansion coefficient) at room temperature between the correction jig 40 and the cylindrical body 34 is sufficient if it is about 4 to $8 \times 10^{-6}$° C./mm. For example, the thermal expansion coefficient of the intermediate product 32 or the cylindrical body 34 at room temperature may be 11 to $13 \times 10^{-6}$° C./mm, whereas the thermal expansion coefficient of the correction jig 40 at room temperature may be 17 to $19 \times 10^{-6}$° C./mm.

When the intermediate product 32 or the cylindrical body 34 is made of a nickel-based alloy (for example, nickel-based heat-resistant steel such as Inconel 718), stainless steel such as SUS304 (Japanese Industrial Standards) or the like can be exemplified as a suitable material of the correction jig 40. When the cylindrical body 34 is made of carbon steel having a carbon content of 0.55% or less, it is preferable to select nickel steel having a nickel content of about 20% as the material of the correction jig 40. Further, when the cylindrical body 34 is made of cobalt heat-resistant steel, it is preferable to select manganese steel having a manganese content of about 10% as the material of the correction jig 40. Suitable combinations of the material of the intermediate product 32 or the cylindrical body 34 and the material of the correction jig 40 are listed in FIG. 7 together with thermal expansion coefficients.

The correction jig 40 and the cylindrical body 34 thus configured are set on the holding jig 36 and loaded into an unillustrated heat treatment furnace.

The outside diameter of the correction jig 40 at room temperature is set to be slightly smaller than the outside diameter of the cylindrical body 34 at room temperature. Specifically, at room temperature, the outside diameter of the correction jig 40 is about 0.05 to 0.4% smaller than the inside diameter of the cylindrical body 34. For example, when the diameter of the cylindrical body 34 is 400 mm, the diameter of the correction jig 40 is set to be smaller by about 0.2 to 1.5 mm. Therefore, when the correction jig 40 is set inside the cylindrical body 34, the peripheral wall of the correction jig 40 separates, in particular, in portions corresponding to the thick walled portion 18, from the inside wall of the cylindrical body 34, as shown in FIGS. 5 and 6A. At this stage, it does not matter if some part of the peripheral wall of the correction jig 40 is in contact with the inside wall of the cylindrical body 34.

In this state, the temperature inside the heat treatment furnace is raised. That is, heat is applied to the correction jig 40 and the cylindrical body 34, and the temperature of the correction jig 40 and the cylindrical body 34 rises. As a result, the correction jig 40 and the cylindrical body 34 expand thermally. As described above, the linear expansion coefficient of stainless steel, which is the material of the correction member, is larger than that of the nickel-based alloy, which is the material of the plate member 30 or the cylindrical body 34. Therefore, for example, at around 450 to 500° C., the outside diameter of the correction jig 40 becomes substantially equal to the inside diameter of the cylindrical body 34.

Figure 6B:
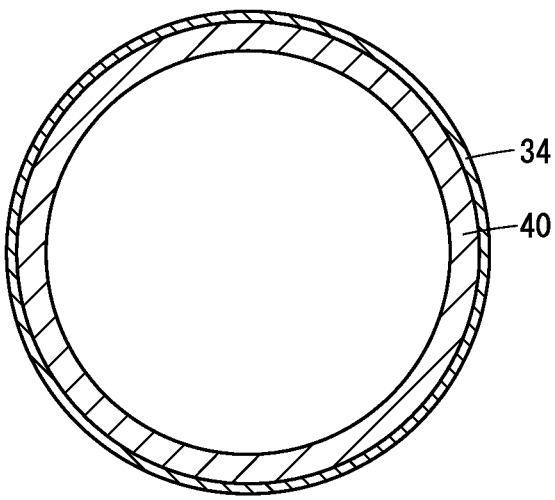

When the temperature is further raised, the theoretical value of the outside diameter of the correction jig 40 exceeds the theoretical value of the inside diameter of the cylindrical body 34. When this situation is reached, the outside of the peripheral wall of the correction jig 40 abuts the inside wall of the cylindrical body 34 over substantially the whole area as shown in FIG. 6B, and further increases the diameter. As a result, in the cylindrical body 34, the portions having a diameter smaller than that of the other portions are pressed from the inside to the outside of the peripheral wall by the correction jig 40 whose diameter is expanding due to thermal expansion. Since the correction jig 40 is set to have a high roundness and thermally expands substantially uniformly over the whole surface, the roundness of the cylindrical body 34 is improved by this pressing. In addition, the diameters of the cylindrical body 34 become uniform.

The heat treatment temperature may be set, for example, in the range of 900 to 1000° C. In this temperature range, the theoretical value of the outside diameter of the correction jig 40 becomes larger about 0.3 to 0.8 mm, or about 1 mm in some cases, than the theoretical value of the inside diameter of the cylindrical body 34.

Figure 6C:
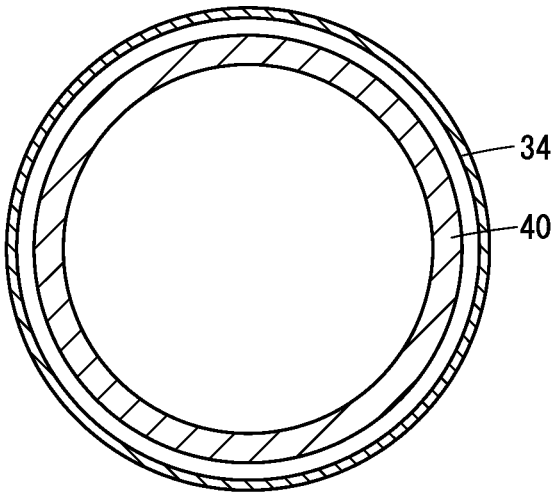

When the temperature of the heat treatment furnace is lowered, the correction jig 40 and the cylindrical body 34 contract, conversely. Since the linear expansion coefficients of the two differ, the outside diameter of the correction jig 40 becomes smaller than the inside diameter of the cylindrical body 34. Therefore, as shown in FIG. 6C, the peripheral wall of the correction jig 40 separates from the inside wall of the cylindrical body 34 wholly.

The cylindrical body 34 starts contracting from a state where the roundness is improved with the diameters uniform as described above. Therefore, the roundness and the diameter of the cylindrical body 34 after drop in temperature substantially match the specified values. In other words, the deviations of the roundness and the diameter from the specified values fall within the tolerance ranges (the roundness and the diameter are approximated to the specified values).

Figure 8:
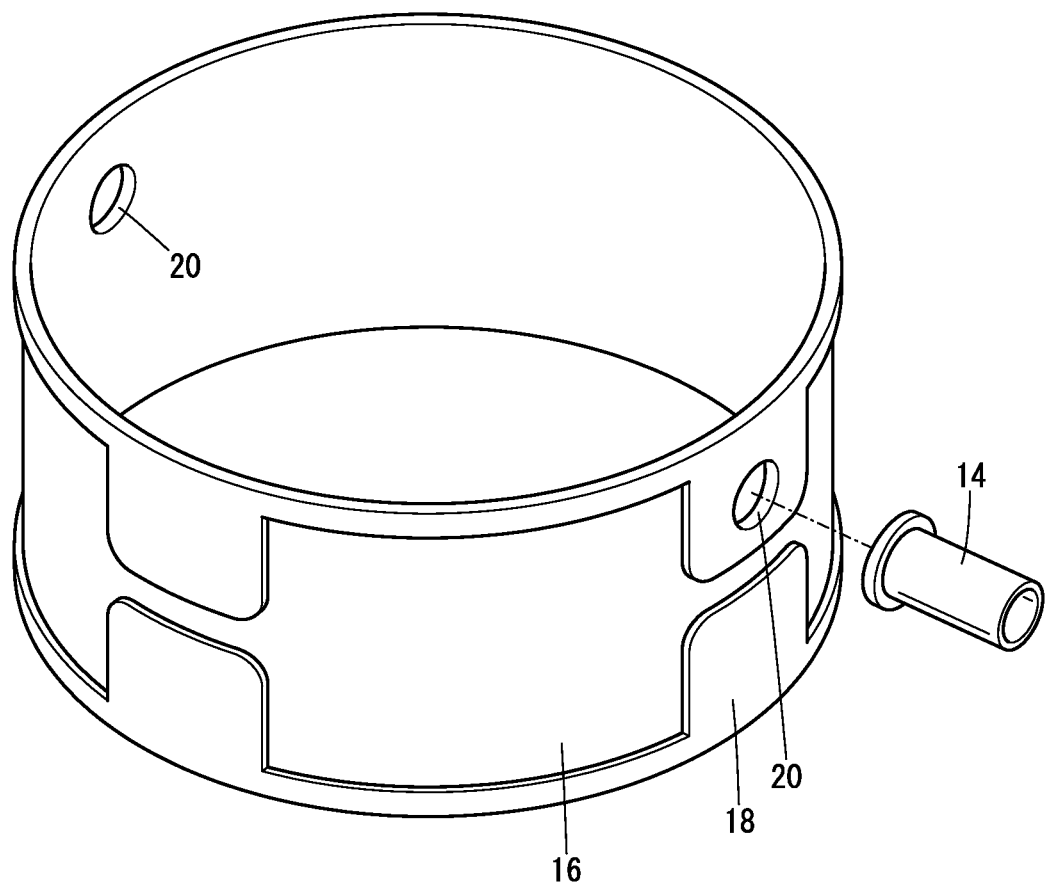
FIG. 8 is an exploded perspective view showing a situation in which through holes have been formed in the cylindrical body and pipe parts are going to be joined to locations where the through holes exist.

Next, at the through hole forming step S4, through holes 20 shown in FIG. 8 are formed in the cylindrical body 34 thus reformed. The through hole 20 can be formed by, for example, cutting out a part of the cylindrical body 34 using a predetermined tool. Since the roundness and the diameter of the cylindrical body 34 are close to the specified values, the through holes 20 can be formed at accurate positions.

Subsequently, the pipe part joining step S5 for joining the pipe parts 14 is performed. As shown in FIG. 8, the pipe part 14 is arranged so that the hollow inside thereof is aligned with the through hole 20, and then is joined to the tubular body 12 by welding, for example. As a result, the tubular member 10 is obtained. Since the through holes 20 are formed at accurate positions, the pipe parts 14 can also be positioned with accuracy.

The tubular body 12 of the tubular member 10 has a roundness and a diameter close to the predetermined specified values as described above, but distortion could occur due to the above-described cutting out, welding and the like. That is, the dimensional accuracy of the roundness and diameter is lower than that when the first heat treatment step S3 was completed. Therefore, in the first embodiment, in order to improve again the dimensional accuracy of the roundness and diameter, the second heat treatment step S6 is performed. The second heat treatment can be performed in the same manner as the first heat treatment, for example.

That is, at the second heat treatment step S6, the correction jig 40 is used in the same manner as described above (see FIGS. 5 and 6C). The heat treatment temperature is set at, for example, 900 to 1000° C.

A portion of the inside wall of the tubular body 12 of the tubular member 10, having a larger diameter than the other portions due to distortion, separates from the peripheral wall of the correction jig 40, as in FIGS. 5 and 6A. When the temperature of the heat treatment furnace rises from this state, the peripheral wall of the correction jig 40 that expands thermally abuts the inside wall in that portion. As the temperature further rises, the inside wall in that portion is pressed by the peripheral wall of the correction jig 40. As a result, the diameter of that portion is expanded (see FIG. 6B).

In this process, the portions of the tubular member 10 that are not distorted and have small diameters have already reached the plastic region beyond the elastic region, so that the portions are pressed by the thermally expanded correction jig 40, from the inside to the outside of the peripheral wall without causing springback. Thus, this pressing improves the roundness of the tubular member 10. In addition, the diameters of the tubular member 10 can be made uniform.

When the temperature of the heat treatment furnace is lowered, the correction jig 40 and the tubular member 10 contract. Since there is a difference in the linear expansion coefficient between the two, the outside diameter of the correction jig 40 is smaller than the inside diameter of the tubular member 10. Therefore, similarly to FIG. 6C, the peripheral wall of the correction jig 40 separates from the inside wall of the tubular member 10 over the whole surface.

The tubular member 10 also contracts with its roundness improved and diameters uniform (with the dimensional accuracy of the diameter improved). Therefore, the roundness and the diameter of the tubular body whose temperature has dropped are approximated to the specified values.

In this way, the cylindrical body 34 after the edge joining step S2 has been performed and the tubular member 10 after the pipe part joining step S5 has been performed are subjected to heat treatment, whereby it is possible to form the tubular member 10, in which the pipe parts 14 are installed at accurate positions in spite of the thin-walled portion 16 with material removed and which is excellent in dimensional accuracy. When a pressure vessel is fabricated with this tubular member 10, it is easy to connect the pipe parts 14 to other components in the pressure vessel. That is, according to the present embodiment, performing heat treatment twice makes it easy to provide a product that is improved in dimensional accuracy.

Figure 9:
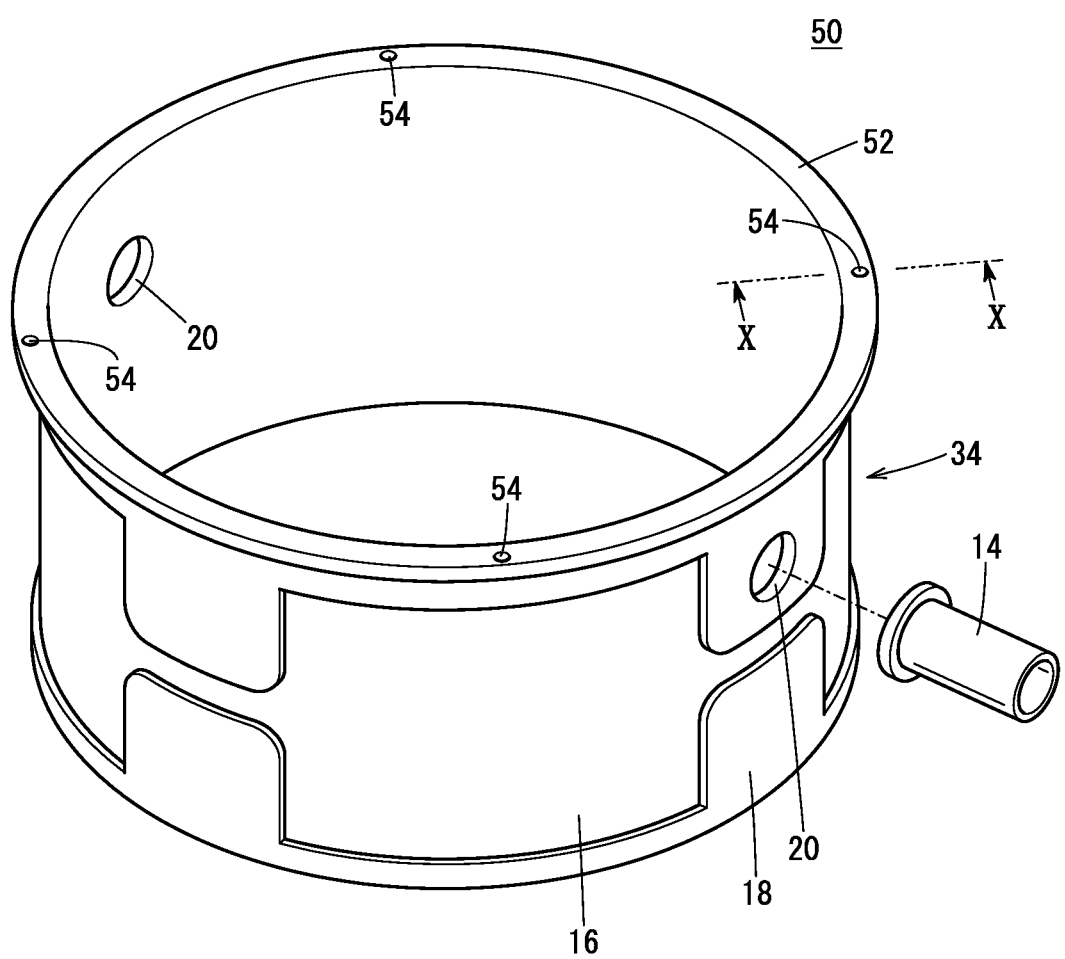
FIG. 9 is an exploded perspective view showing a flanged tubular member formed by welding an L-shaped flange part to the cylindrical body of FIG. 8.

The heat treatment process may be performed three times. This will be described as a second embodiment by taking an example where a flanged tubular member 50 shown in FIG. 9 is fabricated.

Figure 10:
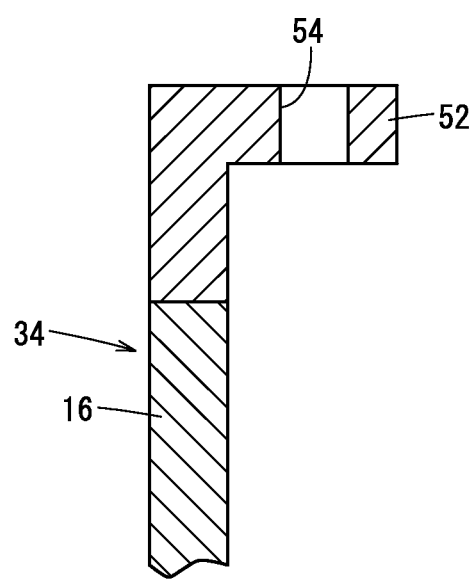
FIG. 10 is a sectional view taken along a line X-X in FIG. 9.

Here, the flanged tubular member 50 is constructed by welding an L-shaped flange part 52 having a substantially inverted L-shape in a front sectional view, to the upper end of the cylindrical body 34, as shown in FIG. 10. This L-shaped flange part 52 has through holes 54 formed in the portion that protrudes radially outward from the cylindrical body 34.

The flanged tubular member 50 thus configured is prepared by a fabrication method according to the second embodiment, following the schematic flow shown in FIG. 11. In this case, a material removing step S10, an edge joining step S20, and a first heat treatment step S30 are performed according to the steps S1 to S3 in the first embodiment. Then, after the first heat treatment step S30, a flange welding step S31 and an intermediate heat treatment step S32 are implemented.

That is, at the flange welding step S31, the L-shaped flange part 52 is welded to the upper end surface of the tubular body 12, that is, the cylindrical body 34 reformed after the edge joining step S20. Through holes 54 have formed in advance in the L-shaped flange part 52. The through hole 54 can be used as a bolt insertion hole through which a bolt for connecting the flanged tubular member 50 to another component, is passed. An L-shaped flange part 52 without through holes 54 formed may be welded to the cylindrical body 34, then through holes 54 may be drilled. In this way, the drilling process and the welding of the L-shaped flange part 52 to the cylindrical body 34 can be performed in any order.

Although the roundness and the diameter of the tubular body 12 are approximated to predetermined specified values as described above, distortion may occur due to welding at the flange welding step S31. That is, there is a concern that the dimensional accuracy of the roundness and diameter is lower than that when the first heat treatment step S30 was completed. Therefore, in the second embodiment, in order to improve again the dimensional accuracy of the roundness and diameter, an intermediate heat treatment step S32 is performed after the flange welding step S31. The intermediate heat treatment step can be performed under the same conditions as those in the first heat treatment, for example.

Thereafter, a through hole forming step S40, a pipe part joining step S50 for joining pipe parts 14, and a second heat treatment step S60 are performed according to the steps S4 to S6 of the first embodiment. As a result, the flanged tubular member 50 shown in FIG. 9 can be obtained.

In this way, the cylindrical body 34 after the edge joining step S20 and/or the flange welding step S31 has been performed, and the flanged tubular member 50 after the pipe part joining step S50 has been performed, are subjected to heat treatment, whereby it is possible to form the flanged tubular member 50, in which the pipe parts 14 are installed at accurate positions in spite of the thin-walled portion 16 with material removed and which is excellent in dimensional accuracy. When a pressure vessel is fabricated with this flanged tubular member 50, it is easy to connect and fasten the pipe parts 14 to other components in the pressure vessel. That is, according to the second embodiment, performing heat treatment three times makes it easy to provide a product that is improved in dimensional accuracy.

The present invention is not particularly limited to the above-described embodiments, and various modifications can be made without departing from the gist of the present invention.

For example, at least one of the first heat treatment step S3 or S30, the second heat treatment step S6 or S60, and the intermediate heat treatment step S32 may be performed without using the correction jig 40.

Alternatively, the combination of the materials of the plate member 30 (cylindrical body 34) and the correction jig 40 is not particularly limited to those exemplified in FIG. 7. Any combination may be used as long as the linear expansion coefficient of the correction jig 40 is larger than that of the plate member 30.

What is claimed is:

1. A fabrication method of a tubular member comprising a tubular body having a peripheral wall including a thick-walled portion and a thin-walled portion, and a through hole penetrating from an outside to an inside of the peripheral wall; and a pipe part attached to the through hole, the fabrication method comprising:

a material removing step of removing material by machining a part of a plate member to obtain an intermediate product including a thin-walled portion where the material is removed and a thick-walled portion with no material removed, the thick-walled portion being thicker than the thin-walled portion;

an edge joining step of bending the intermediate product and joining both edges thereof to obtain a cylindrical body;

a first heat treatment step of performing a first heat treatment on the cylindrical body;

a through hole forming step of forming a through hole from the outside to the inside of the peripheral wall of the cylindrical body;

a pipe part joining step of joining the pipe part to a portion where the through hole is formed, to obtain a tubular member;

a second heat treatment step of performing a second heat treatment on the tubular member; and between the first heat treatment step and the second heat treatment step, a flange welding step of welding a flange part to an opening of the cylindrical body, and an intermediate heat treatment step of performing a heat treatment on the cylindrical body with the flange part welded thereto.

2. The fabrication method according to claim 1, wherein the second heat treatment step is performed by placing, inside the tubular body, a correction jig having a larger linear expansion coefficient than a constituent material of the plate member.

3. The fabrication method according to claim 2, wherein a combination of materials of the correction jig and the plate member is selected so that a difference in thermal expansion coefficient at room temperature between the materials falls within a range of 4 to $8 \times 10^{-6}$ °C./mm.

4. The fabrication method according to claim 3, wherein one of a combination of stainless steel and nickel-based alloy, a combination of nickel steel and carbon steel, and a combination of manganese steel and cobalt heat-resistant steel, is selected as the combination of the materials of the correction jig and the plate member.

5. The fabrication method according to claim 2, wherein the correction jig presses the tubular body from the inside of the peripheral wall to expand a diameter of the tubular body.

6. The fabrication method according to claim 1, wherein the intermediate heat treatment step is performed by placing, inside the cylindrical body, a correction jig having a larger linear expansion coefficient than a constituent material of the plate member.

7. The fabrication method according to claim 6, wherein a combination of materials of the correction jig and the plate member is selected so that a difference in thermal expansion coefficient at room temperature between the materials falls within a range of 4 to $8 \times 10^{-6}$ °C./mm.

8. The fabrication method according to claim 7, wherein one of a combination of stainless steel and nickel-based alloy, a combination of nickel steel and carbon steel, and a combination of manganese steel and cobalt heat-resistant steel, is selected as the combination of the materials of the correction jig and the plate member.

9. The fabrication method according to claim 6, wherein the correction jig presses the cylindrical body from the inside of the peripheral wall to expand a diameter of the cylindrical body.

10. The fabrication method according to claim 1, wherein the first heat treatment step is performed by placing, inside the cylindrical body, a correction jig having a larger linear expansion coefficient than a constituent material of the plate member.

11. The fabrication method according to claim 10, wherein the correction jig presses the cylindrical body from the inside of the peripheral wall to expand a diameter of the cylindrical body.

* * * * *